Patented Oct. 27, 1931

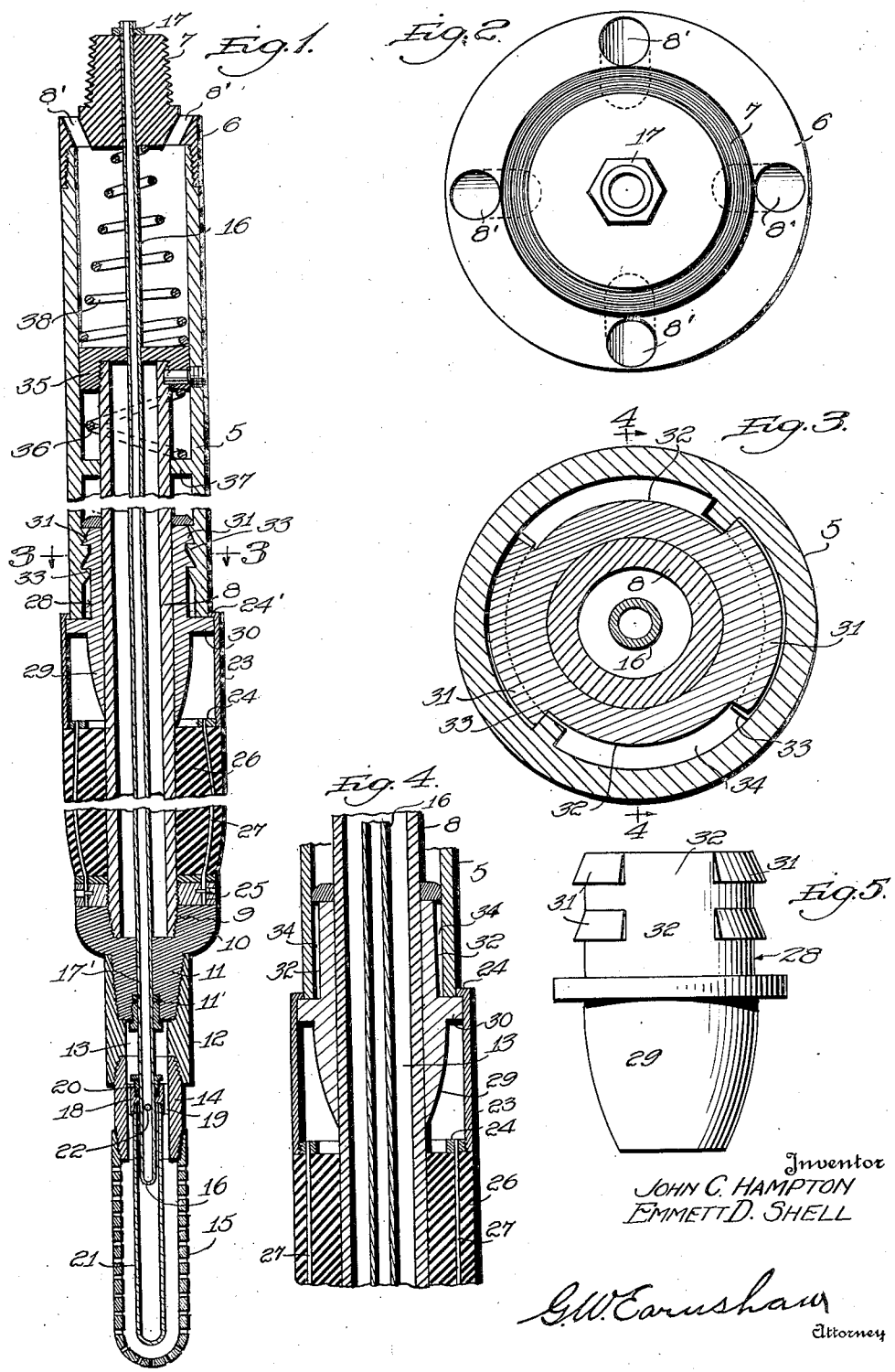

1,828,838

UNITED STATES PATENT OFFICE

JOHN C. HAMPTON, OF ARDMORE, AND EMMETT D. SHELL, OF HEALDTON, OKLAHOMA

APPARATUS FOR TESTING OIL SANDS

Application filed April 26, 1929. Serial No. 358,331.

The present invention relates to apparatus for testing the productiveness of oil or gas bearing sands, in driven wells.

As is well known, in driven wells, in the petroleum districts, the various sands encountered in the sub-strata do not always exhibit their true value when the stratum is opened by the drill. It is also well known that a productive stratum is frequently lost or passed through undiscovered for the reason that the drill hole is full of muddy water, and the oil flow has been so retarded that its value has been misjudged. In accordance with the present invention, the stratum to be tested, is closed or sealed off from the adjacent upper stratum whereby the oil within the oil bearing stratum may be collected, thereby indicating the character of the stratum.

It is particularly understood that no rat holing is necessary in operating this invention, and the amount of hole below the bottom of the stratum, to be tested, in no way affects the operation of the invention.

In the accompanying drawings, forming a part of this specification, and in which like numerals are employed to designate like parts throughout the same, Figure 1 is a central vertical longitudinal section through a testing tool embodying our invention, Figure 2 is a plan view of the same, Figure 3 is a horizontal section taken on line 3—3 of Figure 1, Figure 4 is a detail section taken on line 4—4 of Figure 3, and, Figure 5 is a side elevation of an expanding element or wedge.

In the drawings, wherein for the purpose of illustration, is shown a preferred embodiment of our invention, the tool embodies an outer cylindrical casing 5 screw-threaded at its upper end for engagement with a cap 6, carrying an attaching pin 7, engaging with a line of tubing, drill rod or the like. The cap 6 is provided with openings or ports 8', for the passage and discharge of water or mud, to equalize pressure within the casings 5 and 8.

The outer casing 5 receives therein, in spaced concentric relation, an inner cylindrical casing 8. The inner casing 8 has its lower end screw-threaded to engage within a screw-threaded recess 9 formed in a lower cap 10, and this cap has a depending pin 11 screw-threaded to engage within the upper screw-threaded end of a sleeve 12, having a chamber 13. This sleeve has its lower end screw-threaded for the reception of the upper screw-threaded end of a coupling 14, to the lower screw-threaded end of which is attached a perforated anchor or strainer 15. The pin 11 has a stuffing gland 11', as shown.

The numeral 16 designates a testing tube, extending through an opening in the upper pin 7, and preferably having its upper end screw-threaded for receiving a nut 17. This testing tube extends longitudinally within the inner casing 8 and is slidable through an opening 17', formed in the pin 11 and also through the stuffing gland 11'. Arranged within the coupling 14 is a spider 18, affording passages 19, for the flowing of the oil or fluid. This spider is provided upon its upper side with a stuffing gland 20, through which the testing tube 16 extends. At its lower end, the spider 18 is attached to a covering tube 21, receiving the lower end of the testing tube 16 therein. The testing tube is provided with an opening 22, in its side, while its lower end is closed, and the lower end of the covering tube 21 is also closed. When the testing tube is elevated with relation to the coupling 14, as will be explained, the opening 22 will be brought into communication with the chamber 13.

The numeral 23 designates a preferably cylindrical outer casing section, provided at its top with an inwardly projecting annular flange 24', slidably receiving therein the lower end of the outer casing 5. The lower end of the casing section 23 is screw-threaded and has screw-threaded engagement with a ring 24, preferably formed of metal. The numeral 25 designates a companion metallic ring which is arranged upon the top of the lower cap 10 and is screw-threaded upon the inner casing 8, as shown. Arranged between the rings 24 and 25 is an expansible elastic sealing element 26, which is annular, and formed of rubber or the like. This annular sealing element is preferably reinforced by flexible wires 27, suitably attached to the rings 24 and 25. The annular sealing element 26 is slidably mounted upon the inner casing 8.

The numeral 28 designates a tubular expanding element slidably mounted upon the inner casing 8 and arranged between this casing and the outer casing 5. This tubular expanding element has a lower tapered or wedge shaped portion 29 adapted to be forced into the elastic annular sealing element 26. The expanding element 28 carries an annular flange 30 projecting outwardly therefrom, and arranged beneath the lower end of the outer casing 5, as shown. It is thus seen that the expanding element 28 is moved downwardly into the sealing element 26 by the weight of the outer casing 5 and the string of tubing or the like carried thereby.

The expanding element 28 is provided upon its periphery with segmental ribs 31 spaced vertically, as shown and having horizontal spaces 32 between them. These ribs are adapted to inter-fit with ribs 33, formed upon the inner surface of the enlarged bore of the casing 5, and these ribs 33 are arranged similar to the ribs 31, to detachably inter-lock therewith.

Attached to the top of the inner casing 8 by having screw-threaded engagement therewith is a plunger cap 35, engaging a compressible coil spring 36 arranged beneath the same, which engages a flange 37, formed integral with the outer casing 5. A compressible coil spring 38 engages the top of the plunger cap 35, surrounds the testing tube 16 and engages the cap 6, as shown.

The operation of the apparatus is as follows:

The expanding element 28 is not at first locked to the outer casing 5, and hence these parts may move relatively longitudinally. The implement, with the parts thus adjusted, is lowered into the driven well, with the anchor element 15 engaging the bottom of the well and the sealing element 26 arranged at the top of the stratum to be tested, thereby sealing off the top of this stratum from the adjacent upper stratum. The cap 10 and sealing element 26 being held by the anchor element 15, against further downward movement, the sealing element 26 is expanded, by lowering the outer casing 5, with relation to the inner casing 8. When the casing 5 is thus lowered, its lower end engages the flange 30 thus forcing the expanding element 28 downwardly, causing its tapered or wedge shaped end 29 to pass into the elastic expanding element 26 and to expand the same. The expanding action continues to increase until the flange 30 engages the ring 24, the expanding element now holding the sealing element 26 in the expanded condition. When the outer casing 5 is thus lowered to expand the sealing element, the testing tube 16 is also lowered, and its opening 22 will be retained within the covering tube 21. The casing 5 is now raised, carrying with it the testing tube 16, through the medium of the cap 6 and this raising action is limited by the flange 37 approaching the plunger cap 35. Upon this raising action of the outer casing 5 testing tube 16 is raised sufficiently, whereby opening 22 will pass above the stuffing box 20 and be placed in communication with the chamber 13, whereby oil or other fluid contained within the chamber 13, will enter the testing tube and pass upwardly therein. After the desired test has been made, the outer casing 5 is again lowered so that its lower end engages the flange 30 of the depressed expanding element 28, and the outer casing is then turned clockwise for one-fourth of a revolution, causing ribs 31 to interlock with the grooved ribs 33, and upon subsequent upward movement of the outer casing 5, the expanding element will be raised with it, whereby the tapered or wedge shaped portion 29 will be withdrawn from within the elastic sealing element 26, which will then contract and return to its reduced size, which contracting action is aided by the resilient reinforcing wires 27. The implement may then be entirely removed from the driven well.

It is to be understood that the form of our invention herewith shown and described is to be taken as a preferred example of the same, and that various changes in the shape, size and arrangement of parts, may be resorted to without departing from the spirit of the invention, or the scope of the subjoined claims.

Having thus described our invention, we claim:—

1. A testing apparatus of the character described, comprising a body portion to enter the well, an expansible sealing element carried by the body portion, a fluid receiving chamber arranged beneath the sealing element and connected with the body portion, a covering tube connected with the chamber and having packing means, and a longitudinally adjustable testing tube extending through the body portion and into the covering tube and having its lower end closed and provided in its side with an opening, said opening being arranged to be moved into said chamber when the testing tube is raised.

2. A testing apparatus of the character described, comprising a body portion to enter the well, an expansible sealing element carried by the body portion, a fluid receiving chamber arranged beneath the sealing element and connected with the body portion, a covering tube connected with the chamber, and a longitudinally adjustable testing tube extending through the body portion and having an opening adapted to be covered when the testing tube is lowered, said opening being placed in communication with said chamber when the testing tube is raised.

3. A testing apparatus of the character described, comprising a pair of relatively longitudinally movable members, an expansible sealing element carried by one member, an expanding element longitudinally movably mounted upon the same member, means whereby the other member shifts the expanding element downwardly upon the downward movement of said other member while leaving said other member free to be raised with relation to the expanding element, means to lock the said other member to the expanding element upon a relative turning movement between the same, a testing tube extending through said members, and means to control the inlet of the fluid into the testing tube.

4. A testing apparatus of the character described, comprising inner and outer telescoping members adapted to have relative longitudinal movement, an expansible sealing element carried by the inner member, an expanding element mounted to move longitudinally upon the inner member and having a part arranged in the path of travel of the outer member when it is moved downwardly, said outer member being normally free to move upwardly with relation to the expanding element, means to lock the outer member to the expanding element upon a relative turning movement between the same, a testing tube extending longitudinally through said members and movable longitudinally with the outer member, and means to control the entrance of the fluid into the testing tube depending upon its relative elevation.

5. A testing apparatus of the character described, comprising inner and outer telescoping casings, an expansible sealing element mounted upon the inner casing, an expanding element slidably mounted upon the inner casing and having a flange arranged beneath the lower end of the outer casing and having an upstanding part entering the lower end of the outer casing, means to lock the outer casing and said upstanding part together upon a relative turning movement of the same, a testing tube extending through said casings and connected with the outer casing to be moved longitudinally by the same, and means for controlling the entrance of the fluid into the lower portion of the testing tube depending upon the relative elevation of the testing tube.

6. A testing apparatus of the character described, comprising inner and outer telescoping casings, an expansible sealing element mounted upon the inner casing, an expanding element slidably mounted upon the inner casing and having a flange arranged beneath the lower end of the outer casing and having a part entering the lower end of the outer casing, means to lock the outer casing and said part together upon a relative turning movement of the same, a testing tube extending through the outer casing and inner casing and provided in its lower portion with an inlet opening, a fluid receiving chamber arranged beneath the sealing element and connected with the inner casing, and a covering tube carried by the chamber and receiving therein the lower end of the testing tube, the inlet opening of the testing tube being arranged within the covering tube when it is lowered and within the chamber when the testing tube is raised.

In testimony whereof we affix our signatures.

JOHN C. HAMPTON.
EMMETT D. SHELL.